United States Patent [19]

Daniel

[11] 4,064,080

[45] Dec. 20, 1977

[54] LATEX OF STYRENE POLYMERS WITH TERMINAL AMINO-SULFONATED GROUPS AND METHOD OF MAKING

[75] Inventor: Jean-Claude Daniel, Fontenay-sous-Bois, France

[73] Assignee: Rhone-Poulenc Industries, Paris, France

[21] Appl. No.: 713,056

[22] Filed: Aug. 9, 1976

[30] Foreign Application Priority Data

Aug. 22, 1975 France .................................. 75.26056

[51] Int. Cl.$^2$ .............................................. C08L 89/00
[52] U.S. Cl. ................... 260/8; 260/29.6 R; 260/29.6 MQ; 260/29.7 R; 260/29.7 SQ
[58] Field of Search ................ 260/8, 29.6 R, 29.7 R, 260/29.6 MQ, 29.7 SQ; 526/220, 340

[56] References Cited

U.S. PATENT DOCUMENTS

| | | | |
|---|---|---|---|
| 2,376,014 | 5/1945 | Semon et al. ......................... | 526/340 |
| 2,396,997 | 3/1946 | Fryling ................................. | 526/340 |
| 2,683,698 | 1/1954 | Bates ................................... | 260/29.7 R |
| 4,013,824 | 3/1977 | Uraneck et al. ...................... | 526/220 |

OTHER PUBLICATIONS

Chem. Absts., vol. 75:37533a, Telomers with Terminal Amino Groups, Fokina et al.
Chem. Absts. vol. 71:22520n, Application—Latexes—Emulsion Polymerization, Williams et al.

*Primary Examiner*—Edward M. Woodberry
*Attorney, Agent, or Firm*—McDougall, Hersh & Scott

[57] ABSTRACT

A dispersion of particles having an average diameter within the range of 0.05 to 3 μm formed of a homo- or copolymer of styrene having terminal

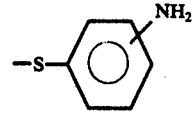

groups and a glass transition temperature above 20° C, and the use of such latex for fixing proteins.

16 Claims, No Drawings

LATEX OF STYRENE POLYMERS WITH TERMINAL AMINO-SULFONATED GROUPS AND METHOD OF MAKING

The invention relates to styrene polymers which have terminal

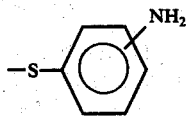

groups and latices containing same. It is also concerned with a method of preparing said latices.

It has previously been proposed to prepare styrene polymers having terminal

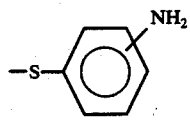

groups by mass polymerization of the styrene in the presence of a chain-transfer agent such as aminophenyl disulphide, but the yields are very low and the polymer has to be dissolved and precipitated for purification before it can be obtained in granular form.

Also known are polybutadiene latices having terminal

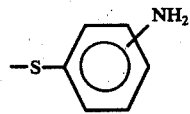

groups, prepared by emulsion polymerization of butadiene in the presence of a chain-transfer agent such as aminophenyl disulphide and an organo-soluble initiator. However, the application of this polymerization method to styrene monomers leads to slow emulsion polymerizations, in which it is often necessary to disperse the chain-transfer agent by means of a solvent, and to secondary mass polymerization of the major part of the styrene monomer, as well as to poor yields and to unstable latices.

The products, prepared in accordance with the practice of this invention, do not suffer from these disadvantages and they form dispersions which are stable under storage and under mechanical shock; the method whereby they are polymerized is simple and does not require the presence of a solvent for introducing the chain-transfer agent; there is no secondary mass polymerization, and yields are good.

According to the invention, the styrene polymers having terminal

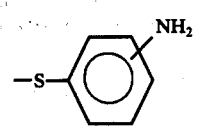

groups are characterized in that they are in the form of stable latices, the polymer particles of which have an average diameter of between 0.05 and 3 μm, and in that they have a glass transition temperature above 20° C.

The polymer particles having an average diameter of between 0.05 to 3 μm and preferably between 0.1 to 1 μm generally constitute 1 to 70% by weight and preferably 5 to 50% by weight of the latex in accordance with the invention. However, the latex may be diluted without adversely affecting its stability.

The expression "styrene polymer" means the homopolymers of styrene or of styrene derivatives such as methyl styrenes, vinyl toluene, ethyl styrene as well as the copolymers of styrene or its derivatives and copolymerizable vinyl monomers such as alkyl acrylates and alkyl methacrylates, the alkyl group of which contains 1 to 10 atoms of carbon, acrylonitrile and methacrylonitrile, or diene monomers such as butadiene and its derivatives. This comonomer may represent up to 90% by weight of the copolymer and preferably less than 50% by weight thereof, provided that the glass transition temperature is above 20° C.

In the method of the invention, the styrene monomeric component is polymerized either alone or mixed with a copolymerizable vinyl monomer or diene monomer, in an aqueous emulsion in the presence of a chain-transfer agent, such as aminophenyl disulphide or aminophenyl mercaptan, present in an amount within the range of 0.1 to 10% by weight of the monomer, and at least one emulsifying agent and a water-soluble diazo initiator.

The styrene compound may be, among others, styrene and its derivatives such as methyl styrene, vinyl toluene and ethyl styrene.

Examples of the copolymerizable vinyl monomers that may be used are acrylonitrile and methacrylonitrile and alkyl acrylates and alkyl methacrylates, the alkyl group of which contains 1 to 10 carbon atoms, and examples of the diene monomers that may be used are butadiene and its derivatives. The copolymerizable monomer is used in quantities which may be as high as 90% by weight of the monomer mixture, but generally the proportion thereof does not exceed 50% by weight. The proportion is dependent upon the glass transition temperature of the polymer to be obtained, which temperature should be above 20° C. All or part of the monomers is introduced before the commencement of polymerization, and in the latter case the remaining part is introduced in successive fractions or continuously during polymerization. The monomers may likewise be introduced during polymerization, in successive fractions or continuously. The procedure for introducing the monomers will depend upon the required mean size of the latex particles.

The aminophenyl disulphide or aminophenyl mercaptan type transfer agent is represented in particular by o,o'-dithio-bis-aniline, p,p'-dithio-bis-aniline, 2-mercaptoaniline, 3-mercapto-aniline and 4-mercapto-aniline. This agent is generally employed in solution in the monomer or monomers in proportions of between 0.1 and 10% and preferably of between 0.5 and 5% by weight of the monomer or monomers.

The emulsifying agent may be anionic and/or cationic and/or non-ionic of the type conventionally used in emulsion polymerizations. Examples of anionic emulsifying agents that may be used are: the fatty acid salts; the alkaline alkyl sulphates, alkyl sulphonates, alkyl aryl sulphonates, alkyl sulphosuccinates, alkyl phosphates; the alkyl sulphosuccinates; the alkyl-phenol polyglycol ether sulphonates; the alkylsulpho polycarboxylic acid ester salts; the condensation products of fatty acids and oxy- and amino-alkanesulphonic acids; the sulphated derivatives of polyglycol ethers; the sulphated esters of fatty acids and polyglycols; and the alkanol amides of sulphated fatty acids.

Examples of cationic emulsifying agents that may be used are represented by alkylamines and their water-soluble salts, and the soluble salts of alkylamines wherein N is substituted by alkyl and/or alkylaryl and/or hydroxyalkyl radicals. The non-ionic emulsifying agents that may be used are represented by the polyalcohol fatty esters, fatty acid alkanolamides, ethylene polyoxides, ethylene-propylene copolyoxides and oxyethylene alkyl-phenols.

The quantities of emulsifying agent or agents to be used are in the order of 0.05 to 10% by weight of the monomer or monomers, and said agent or agents is or are introduced in totality or in part prior to polymerization, the remaining part being added to the reaction medium during polymerization in successive increments or continuously, depending upon the average diameter desired of the latex particles.

Examples of the water-soluble diazo initiator that may be used are sulphonated azonitriles of the type disclosed in French Pat. No. 1,233,582 and of which the following may be mentioned: azo-bis-(sodium isobutyronitrile sulphonate), azo-bis-(sodium α-methylbutyronitrile sulphonate), azo-bis-(sodium α-methyl β-ethoxy-carbonylbutyronitrile sulphonate); carboxylic azo-nitriles such as 4,4'-azo-bis-(4-cyanopentanoic) acid and its salts; azo-bis-alkylamidinium salts, such as α,α'-azo-bis-isobutyramidinium chloride and azo-bis-N,N'-dimethylene isobutyramidinium chloride.

The initiator, employed in quantities of 0.01 to 3% and preferably 0.1 to 1% by weight of the monomer or monomers, is introduced in totality or in part prior to polymerization, the remaining part being added to the reaction medium during polymerization, in successive fractions or continuously, particularly when the half-life of the initiator at polymerization temperature is short.

The quantity of water to be used in polymerization should be such that the concentration of the monomer or monomers is between 1 and 70% and preferably between 5 and 50% by weight.

The polymerization temperature, which is a function of the initiator used, is generally between 20° and 100° C and preferably between 40° and 90° C.

The latices in accordance with the invention can be used for fixing proteins on the polymer by covalent chemical bonds. The obtained latices of polymer-protein complex are then used for purifying other proteins or as diagnostic reagents.

Embodiments of the invention are hereinafter given by way of non-limiting examples in which the proportions are expressed as parts by weight.

EXAMPLE 1

The following were introduced into a reaction vessel:
300 parts of softened water,
3.8 parts of cetyltrimethyl ammonium chloride,
100 parts of styrene, and
1 part of p,p'-dithio-bis-aniline.

Air was eliminated by passing a stream of nitrogen through the mixture which was then heated to 50° C with stirring, this temperature being maintained during the entire period of the reaction.

When the mixture had reached a temperature of 50° C, 0.13 part of α,α'-azo-bis-isobutyramidinium chloride was added, and polymerization was allowed to proceed for a period of 22 hours. The mixture was then cooled.

For a conversion rate of 80% by weight, a latex was obtained having a particle concentration of 20% by weight. These particles had an average diameter of 0.1 μm.

After six months, the latex obtained contained no flocculate, which demonstrates its good stability during storage.

A portion of the latex was coagulated, and the polymer obtained was dried and then dissolved in benzene and precipitated with methanol three times. The glass transition temperature Tg was determined on the separated polymer in a Du Pont DSC 990 apparatus fitted with a corundum reference cell, and in an argon atmosphere with a linear temperature rise of 20° C/min. The number of —$NH_2$ functions were also measured by dissolving a known weight of polymer in a mixture of benzene and acetic acid and then titrating the solution with perchloric acid, standardized with potassium acid phthalate; this operation was followed by potentiometry.

The Tg was 82° C.

The polymer contained $2 \times 10^{-5}$ moles of —$NH_2$ per gram.

EXAMPLE 2

The same prcedure as in Example 1 was employed except that 3.5 parts of sodium laurylsulphate was used instead of the 3.8 parts of cetyltrimethyl ammonium chloride, and 0.2 part of azo-bis-(sodium α-methylbutyronitrile sulphonate) was used instead of the 0.13 of one part of α,α'-azo-bis-isobutyramidinium chloride.

The conversion rate was 90% by weight,
the latex concentration was 23% by weight,
the particle diameter was 0.1 μm,
the latex remained stable after being stored for more than six months, and
the polymer had a Tg of 85° C and contained $2.2 \times 10^{-5}$ moles of —$NH_2$ per gram.

EXAMPLE 3

The following were introduced into a reaction vessel:
1000 parts of water,
7 parts of dihexyl sulphosuccinate,
100 parts of styrene, and
2.5 parts of p,p'-dithio-bis-aniline.

Air was eliminated by passing a stream of nitrogen through the mixture which was then heated to 70° C while being stirred, which temperature was maintained during the entire period of the reaction.

When the mixture had reached 70° C, 1.1 parts of azo-bis-(sodium α-methylbutyronitrile sulphonate) was added thereto, and polymerization was allowed to proceed for 22 hours. The mixture was then cooled.

For purposes of comparison, the same procedure was carried out but without p,p'-dithio-bis-aniline.

The following results were obtained:

|  |  | Example 3 | Comp. Example |
|---|---|---|---|
| conversion rate | % by weight | 80 | 87 |
| latex concentration | % by weight | 7 | 7.3 |
| particle average diameter | μm | 0.3 | 0.2 |
| stability of latex | 6 months | > | > |
| polymer: Mn* |  | 10 200 | 188 000 |
| Mw* |  | 19 000 | 541 000 |
| Tg | ° C | 80 | 97 |

-continued

|  | | Example 3 | Comp. Example |
|---|---|---|---|
| quantity of —NH$_2$ | moles/g | 10 × 10$^{-5}$ | 0 |

*Mn = number-average molecular weight
*Mw = weight-average molecular weight, determined by gel-permeation chromatography.

The difference between the molecular weights and the Tg of the Example 3 product and the comparative product show that the p,p'-dithio-bis-aniline performed the function of chain-transfer agent in an effective manner and was firmly fixed on the polymer.

I claim:
1. Styrene polymers having terminal

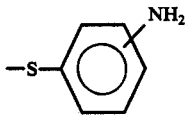

groups in the form of stable latices, the polymer particles of which have an average diameter of between 0.05 and 3 μm and a glass transition temperature above 20° C.

2. Polymers as claimed in claim 1 comprising homopolymers of styrene or its derivatives.

3. Polymers as claimed in claim 1 comprising copolymers of styrene or its derivatives with vinyl monomers.

4. Polymers as claimed in claim 1 comprising copolymers of styrene or its derivatives with diene monomers.

5. A method of preparing latices of polymers having terminal

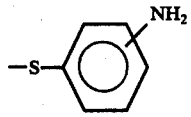

groups, in the form of stable latices, the polymer particles of which have an average diameter of between 0.05 and 3 μm and a glass transition temperature above 20° C, comprising polymerizing a styrene compound, alone or in admixture, with a copolymerizable vinyl monomer in an aqueous emulsion in the presence of 0.1 to 10% by weight of a chain transfer agent, selected from the group consisting of aminophenyl disulphide and aminophenyl mercaptan at least one emulsifying agent, and a water soluble diazo initiator.

6. The method as claimed in claim 5, in which the copolymerizable vinyl monomer is replaced in whole or in part with a copolymerizable diene monomer.

7. A method as claimed in claim 6 in which the diene monomer is selected from the group consisting of butadiene and its derivatives.

8. A method as claimed in claim 5 in which the styrene compound is selected from the group consisting of styrene, methyl styrene, vinyl toluene and ethyl styrene.

9. A method as claimed in claim 5 in which the vinyl monomer is selected from the group consisting of acrylonitrile, methacrylonitrile, alkyl acrylates and alkyl methacrylates in which the alkyl group contains from 1 to 10 carbon atoms.

10. A method as claimed in claim 8 in which the vinyl monomer is present in an amount up to 90% by weight.

11. A method as claimed in claim 9 in which the diene monomer is present in an amount up to 90% by weight.

12. A method as claimed in claim 5 in which the emulsifying agent is selected from the group consisting of an anionic agent, a cationic agent and a non-ionic agent and is present in an amount within the range of 0.05 to 10% by weight of the monomer or monomers.

13. A method as claimed in claim 5 in which the water soluble diazo initiator is selected from the group consisting of sulfonated azo-nitrile carboxylated azonitrile, an azo-bis-alkylamidinium salt and is present in an amount within the range of 0.01 to 3% by weight of the monomer or monomers.

14. A method as claimed in claim 5 in which the concentration of monomer or monomers in the reaction media is within the range of 1 to 70% by weight.

15. A method as claimed in claim 5 in which the polymerization temperature is within the range of 20°–100° C.

16. Proteins fixed on the latex formed of the polymer particles of claim 1.

* * * * *